United States Patent Office 2,857,355
Patented Oct. 21, 1958

2,857,355

POLYETHYLENE-ESTERSIL COMPOSITION

Ralph K. Iler, Brandywine Hundred, Del., assignor to E. I. du Pont de Nemours and Company, Wilmington, Del., a corporation of Delaware No Drawing. Application October 27, 1953
Serial No. 388,671

2 Claims. (Cl. 260—41)

This invention relates to novel compositions comprising a non-elastic, organic solid and, dispersed with respect thereto, an estersil, usually in minor proportion relative to the organic solid, an estersil being a composition which is organophilic, being preferentially wetted by butanol in a butanol-water mixture, and which comprises a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen. In one preferred aspect the invention is more particularly directed to liquid coating compositions which are dispersions of the non-elastic, organic solid and the estersil in an evanescent liquid carrier; in another preferred aspect the invention is more particularly directed to solid dispersions consisting essentially of a minor proportion of an estersil dispersed in a matrix of the non-elastic, organic solid.

This application is a continuation-in-part of my application Serial No. 171,760, filed July 1, 1950. The estersils employed as components in the compositions of the present invention are more fully described and are claimed, per se, as novel compositions in my copending application Serial No. 315,930, filed October 21, 1952.

To make an estersil one takes a substrate of particles larger than colloidal size having a surface of silanol (SiOH) groups and esterifies it under substantially anhydrous conditions with a primary or secondary alcohol having from two to eighteen carbon atoms in its structure. The substrate thus acquires a coating of —OR groups bound to the silica surface, and since the alcohol used was primary or secondary, the particular atom in the —R chain attached to the oxygen atom will also necessarily be attached to at least one hydrogen atom. The substrate particles are of such a size and character that they have a specific surface area of at least one square meter per gram—that is, either the individual particles are solid, dense, siliceous material so finely divided that the surface area is in this range, or the particles are larger but so porous that the surface area is thus extended.

Suitable substrates for making into estersils may be in any of a wide variety of forms. Although the surface must be silica, the substrate need not be silica throughout its structure, and materials, upon the surface of which silica has been deposited or otherwise effected to be present, are entirely suitable. Particles of clay, talc, asbestos, mica, and other silicate minerals, for instance, have some surface silanol groups and may be esterified to form estersils, or the proportion of surface silanol groups may be increased by depositing amorphous silica thereon or by treating the silicates with an acid, such as sulfuric, to dissolve out metal ions and leave more silanols.

Preferred as substrates for some uses, however, are amorphous silica products, especialy porous, coherent aggregates of ultimate, amorphous silica particles. Silica gel has such a structure and may be used as a substrate. The esterification of a silica in the form of very small, discrete particles having a gel structure within the particles was described in my application Serial No. 590,728, filed April 27, 1945. Open-pored substrates of this general type, wherein the pores have an average diameter of at least four millimicrons, can be esterified and then dried, preferably from an organic liquid, to give estersils which are very porous and easily crushed by mechanical action. The structure of the aggregates in the substrate may be reinforced, prior to esterification, by mixing them with an aqueous dispersion of active silica and heating above 60° C. at a pH of 8 to 11, whereby the active silica accretes to the aggregates, as described in application Serial No. 99,354, filed June 15, 1949, by Alexander, Wolter, and myself.

The ultimate silica units in the aggregates of substrate need not be the 2 to 5 millimicron particles present in a conventional silica gel. Rather, they may be built-up particles, such as those of the Bechtold and Snyder application, Serial No. 65,536, filed December 15, 1948 (now Patent No. 2,574,902). For instance, a sol prepared by ion exchange as described in Bird Patent No. 2,244,325 may be heated above 60° C. and further quantities of the same type of sol may be added with continued heating until at least five times as much silica has been added as was originally present, whereby the ultimate silica particles are built-up into the size range of 15 to 130 millimicrons. These particles may be coalesced, as by adding a long-carbon-chain nitrogen compound as described in my application Serial No. 99,355, filed June 15, 1949. Alternatively, ultimate silica units may be built up in the presence of salts by adding an acid, such as sulfuric, to a sodium silicate solution above 60° C. at a sodium ion normality not over one, over a period of time, as described in my copending application Serial No. 65,526, filed December 5, 1948, or by adding to a silica sol above 60° C. a silicate solution and enough acid to maintain the pH at from 8 to 11, and continuing the additions until the ultimate units have reached the desired size, as described in application Serial No. 99,350, filed June 15, 1949, by Alexander, Wolter and myself.

The alcohol used for esterifying the substrate may be any primary or secondary alcohol having at least two carbon atoms. The alcohol may be straight- or branched-chain, or alicyclic, saturated or unsaturated, alkyl or aromatic. Examples of alcohols which may be used are: ethyl, n-propyl, n-butyl, n-pentyl, n-hexyl, n-heptyl, n-octyl, n-nonyl, n-decyl, n-undecyl, n-dodecyl, n-tetradecyl, n-hexadecyl, n-octadecyl, isobutyl, isoamyl, 2,2,4-trimethyl hexane-1-ol, 5,7,7-trimethyl 2-octane-1-ol, isopropyl, sec-butyl, sec-amyl, sec-n-octyl, methyl isobutyl carbinol, di-iso-propyl carbinol, cyclopentanol, cyclohexanol, cycloheptanol, menthol, allyl, crotyl, oleyl, citronellol, geraniol, propargyl, benzyl, beta-phenyl-ethyl, hydrocinnamyl, alpha-methylbenzyl, and cinnamyl.

To effect esterification, the alcohol is heated with the substrate under substantially anhydrous conditions. Water formed by the reaction is removed, as by azeotropic distillation. Usually an excess of the alcohol over that theoretically required is employed, and the water content of the alcohol at the end of the reaction period should not exceed about 5% for organophilic products, 3% for hydrophobic products, or 1.5% for maximum esterification. The rate of reaction increases as the temperature is raised, suitable temperatures to give the indicated type of product in a one-hour reaction time being as follows:

|  | Primary Alcohols, ° C. | Secondary Alcohols, ° C. |
| --- | --- | --- |
| Organophilic | 100 | 130 |
| Hydrophobic | 118 | 225 |
| Maximum esterification | 190 | 275 |

The esterified products are organophilic in that in a two-phase n-butanol-water system, for instance, they prefer to be wet by the butanol. When sufficiently esterified they are hydrophobic—that is, are not readily wetted by water. When esterified to the maximum degree, they are impervious to methyl red dye and do not adsorb it from anhydrous benzene solution. The —OR groups in the estersils are chemically reacted with the silica surface and cannot be removed by washing with hot methyl ethyl ketone or similar solvents, or by prolonged extraction in a Soxhlet extractor. No alcohol is displaced from the silica by treatment with solvents.

The properties of estersils are related to the number of ester groups per unit surface area of the substrate. Although the surface-modifying characteristics of different —OR groups varies considerably, an estersil is generally organophilic when there are present on the surface more than about 100 ester groups per 100 square millimicrons of substrate surface area. When this proportion is 200 or more ester groups per 100 square millimicrons of substrate area the products are generally hydrophobic, and when it is 270 or more, the products do not adsorb methyl red dye from anhydrous benzene solution. On an unknown estersil the —OR group can be identified by decomposing the estersil with acid to release the alcohol, and identifying the alcohol by usual analytical methods. The substrate surface area can be measured by burning off the ester groups in a stream of oxygen at 500° C., and determining the specific surface area of the residue by nitrogen adsorption according to the method of P. H. Emmett, Symposium on New Methods for Particle Size Determination in the Sub-Sieve Range, A. S. T. M., March 4, 1941, p. 95.

Now according to the present invention it has been found that if a minor proportion of an estersil, as above defined, is dispersed relative to a major proportion of a non-elastic organic solid, there is produced a novel composition comprising the estersil and organic solid, the composition having unique and unexpected properties by reason of the presence of the estersil. The nature of the novel compositions depends, in part, upon the physical character of the organic solid. If the organic solid is in a dispersed condition in a continuous phase of an evanescent liquid carrier, the compositions are useful as improved coating agents, whereas if the organic solid is present as a matrix in which the estersil is dispersed the compositions are useful as reinforced resins or plastics.

The organic solid in the compositions of this invention is an organic material which exists as a solid at ordinary atmospheric temperatures of, say, 0 to 120° F., in the absence of a dispersant. It will be understood that in the novel compositions herein described the solid may be dissolved or dispersed in a solvent so that it is colloidally, or even molecularly, dispersed, and that the term "solid" refers to the material in its normal state in a mass, and distinguishes it from materials which normally are liquids or gases.

The organic solid is non-elastic. This means that it is a material which either cannot be stretched, or if stretched, will not return with force to its original length. More precisely, the material is not an "elastomer" according to the accepted meaning of that term as found in Modern Plastics Encyclopedia, 1950 edition, at page 30—namely, "a material which at room temperature can be stretched repeatedly to at least twice its original length and upon immediate release of the stress will return with force to its approximate original length."

In a preferred aspect of the invention the organic constituent, with respect to which the estersil is dispersed, is amorphous, and in certain particularly preferred compositions is a plastic material such as certain organic polymers.

In the aspect of this invention pertaining to compositions wherein the organic solid and estersil are mutually dispersed in an evanescent liquid, the liquid is evanescent in the sense that it can be removed to leave a mass of the organic solid in which the estersil is dispersed. The liquid can be a solvent or dispersant such as water or an alcohol or ketone which is volatile and can be evaporated off. It can be a monomer such as monomethylmethacrylate which can be polymerized to a solid polymer. It can be a liquid which cross-links with the organic solid constituent and thereby disappears as a separate liquid phase. It can be evanescent for a combination of the above reasons. Such compositions containing an evanescent liquid are useful as coating compositions in various relationships, as more fully described hereinafter.

The nature of the compositions of this invention, and their usefulness, can more easily be described by reference to particular instances of such use. It will be understood, however, that such specific disclosures are illustrative only, and that the invention has broader scope commensurate with the disclosure already given.

Considering first the novel coating compositions, a typical embodiment of the invention is seen in wax polishes and coating agents in which an estersil is dispersed. In this instance the wax is, of course, the non-elastic organic solid.

Floor waxes, for wooden floors as well as linoleum, are improved by the incorporation of estersils. For example, wax emulsions can be prepared by methods with which the art is acquainted, utilizing the conventional components of floor waxes such as carnauba wax. The estersil provides a transitory dispersing action which disappears when the wax emulsion is dried on the floor surface, giving a waterproof finish having greater slip-resistance. Estersils can also be added to paste waxes, for example, those containing carnauba wax and hydrocarbon solvents. In this case, the estersil improves the anti-slip properties of the wax finish and facilitates polishing.

The invention has application to such aqueous wax dispersions as the relatively dilute wax suspensions of the self-polishing type, the more concentrated water-containing wax pastes, and other such compositions in which a wax is dispersed in an aqueous medium. The improvement in slip-resistance is, of course, particularly important in the case of floor waxes. The advantage of freedom from loss of luster is particularly important in the case of the self-polishing wax polishes. Moreover, inclusion of estersils according to the invention has the further advantage of improving the luster of films obtainable from certain wax suspensions.

The suspensions, without the estersil, ordinarily give coatings of poor luster which are herein referred to as "normally low-gloss coatings." Such compositions are used despite their poor luster because their ingredients are relatively cheap, and the estersil inclusion therefore is particularly desirable because it renders these compositions competitive with more expensive high gloss products.

The improvement in slip-resistance effected by inclusion of estersils in a wax coating will be understood to mean the increase in force parallel to the plane of the wax coating required to cause an object, such as a shoe sole, to slide over the wax coating, as compared to the similar force for the coating without the estersil inclusion.

The improvement in luster of normally low gloss coatings occasioned by inclusion of estersils refers to the increase in light reflectance thus obtained. It will be understood that this effect is most pronounced for coatings which without the estersils have the poorest luster.

The term "wax" as used herein will be understood to include not only the naturally occurring materials composed largely of fatty acid esters of high molecular weight monohydric alcohols, such as carnauba, candelilla, and bees-wax but also other organic, water-insoluble materials which have the physical character of waxes. This is in accord with general usage in the art, as is illustrated in an article entitled Waxes in Industry—I, by A. H. Woodhead, in Paint Manufacture, vol. 17, page 40 (1947).

It has been the practice in recent years to include in the term "wax" those substances which bear some physical resemblance to any of the natural waxes, including paraffins and ozokerites. This definition is more useful since the inception of a large range of synthetic products of wax-like appearance and physical behavior, and it is due to this conception that such substances as naphthalene chlorides, polyethylenes, many higher hydrocarbons, and even glyceride esters are now termed "waxes" and are used industrially as waxes. A wax, then, is a substance, usually complex, which is of amorphous or microcrystalline structure and usually lacking excessive "tack" at normal temperature, and which melts fairly sharply to give a (usually) mobile liquid at a temperature but little higher than its normal melting-point. This definition largely excludes resins and the common simpler crystalloidal chemicals.

While this definition largely excludes resins it will be noted that there is a group of high molecular weight polymeric materials commonly called "synthetic waxes" which have wax-like physical properties and hence are included within the definition. It has been found that emulsions or, more properly, suspensions of such high molecular weight polymeric waxes, in combination with estersils, provide improved waterproofing and polishing compositions in accordance with this invention.

The waxes thus fall into three general categories, namely, the ester waxes mentioned above which are usually naturally occurring either as plant exudations or animal excreta, the hydrocarbon waxes, often referred to as mineral waxes, including montan, ozokerite, ceresin, and paraffin, and synthetic polymeric waxes, including condensation products of hardened castor oil or octadecanediol with boric acid, monobasic carboxylic acid esters of perhydrogenated novolac, polyethylene adipate, telomerization products of ethylene and dichloracetic acid, and ethylene/bromacetic acid.

The amount of a wax used in an aqueous dispersion of this invention may be widely varied depending upon the particular use for which the composition is intended. When the composition is in paste form, as in the "rub-to-polish" type, the proportion of wax may be from 20 to 40% by weight of the total. On the other hand, in the aqueous wax dispersions of the "self-polishing" type, in which the estersil is particularly effective, the proportion of wax may be from about 10 to 15% by weight of the total.

The proportion of estersil used in an aqueous dispersion of this invention may be considerably varied depending upon the use for which the composition is intended. In paste waxes of the "rub-to-polish" type containing from 20 to 40% wax, the composition may contain up to about 18% by weight of estersil, calculated as $SiO_2$. In the aqueous dispersions of the "self-polishing" type, containing from about 10 to 15% of wax, the estersil is preferably in the range of about 3 to 9% by weight, calculated as $SiO_2$.

The aqueous way dispersions of this invention may be prepared according to methods with which the art is familiar and will ordinarily contain a dispersing agent such as mono-, di-, or triethanolamine oleate or stearate, 2-amino, 2-methyl 1-propanol, sodium or potassium soaps, morpholine oleate, or monoethylamine oleate.

Special wax coatings, particularly those involving carbon black and dyestuffs, such as typewriter carbon paper and other types of transfer coatings, may be improved by incorporating estersils into the wax coating compositions to improve the mechanical properties and permit the use of lower grade waxes. In the dried coating the estersils improve the hardness sufficiently to reduce smudging, without preventing satisfactory transfer of the color when the impression is made.

Estersils provide an excellent base for the adsorption of small amounts of resinous silicone polymers for the preparation of glass-cleansing tissues and polishes and cleaners. Upon application of this type of wax emulsion stabilized with estersils, to textiles, drying and heating hydrolyzes the ester groups on the estersils, particularly where these are of the shorter chain alkoxy types, thus destroying the dispersing action of the estersils and leaving a highly insoluble hydrophobic coating on the textile material.

Estersils are useful in the wax coatings employed in making improved paper and fiber containers and other waxed paper products. Estersils, for example, can be used in quantities ranging up to 20 or 30% in the wax used for waxing boxes and paper milk containers. This is particularly advantageous in that a much thicker coating of wax can be applied in a single dip, and the coating does not run off before it solidifies, thus providing a more even protection. In the case of waxed paper, the incorporation of estersils into the wax which is applied to the paper, gives a sheet which has less tendency to block during hot weather and when exposed to heat does not exude as readily from the paper.

Still another important application for estersils is in coating compositions used to provide water repellent finishes for textiles in which the estersils are utilized as dispersing agents for organic water-proofing agents such as waxes and high-melting hydrophobic compounds of this type. The estersils in this case function as transitory dispersing agents in emulsions of waterproofing agents which are to be applied to textiles. For this use, partially esterified estersils are preferred. The estersils, for example, can be stirred into melted wax, hot water then added, and the mixture passed through a colloid mill to provide a wax emulsion stabilized by the estersil. Microcrystalline paraffin wax, carnauba, beeswax, and other wax types can be employed, although for reasons of economy and hydrophobing action, microcrystalline wax may be preferred. Organo-silicon, or "silicone" oils and resins which are utilized for water-proofing purposes may be incorporated with estersils and applied to textiles.

Water repellent finishes for paper can utilize estersils in the same way as previously described in the case of water repellents for fabrics, namely the estersils acting as dispersing agents for the water repellent waxes and resins.

Flameproofing agents of new types for paper can be made by dispersing flameproofing material such as ammonium sulfamate in synthetic resin compositions by means of estersils, which are then applied to paper. For example, chlorinated paraffin wax may be melted and mixed with estersils, a concentrated solution of ammonium sulfamate added and dispersed throughout the wax, and then applied to paper to provide a waxed paper of lower flammability.

Coating compositions containing dispersed estersils and waxes or resins can be used advantageously for coating individual fibers, as in the sizing of paper.

For instance, estersils may be applied to paper in the beater, particularly in combination with paraffin wax, utilizing the estersils as dispersing agents. Wax-estersil-stabilized emulsions are negatively charged and can be coagulated upon the fibers in the beater by the addition of alum.

Sizes for paper, to be used either in the beater or in the size tub, can be improved by the addition of estersils, particularly where the latter are used as dispersing agents for the wax or resin sizing agents. Sizes of the type utilized to give improved wet strength, including phenol formaldehyde emulsions and alkyd resin emulsions, are improved by the incorporation of estersils which supply additional dispersing action and at the same time improve adhesion of the cured resin to the paper fibers.

The above-described sizes, containing the estersil, can be dispersed in a liquid medium and applied in either dilute or concentrated form and can be applied to the paper according to methods with which the art is already familiar in connection with the application of sodium silicate to paper. Thus, the sheet can be immersed in the dispersion or the dispersion can be applied from a transfer roll, by spraying, or by other mechanical applicators. The silica content of the finished paper can be from 0.5 to 25% $SiO_2$ by weight, from 0.5 to 6.0% being preferred.

It will be understood that various assistants commonly used in treating paper may be used in conjunction with the estersil dispersion. Thus, in addition to the coating agents such as casein, waxes, and gums, pigments such as titanium oxide, fillers such as clays, whiting, and wood flour, assistants such as wetting agents and penetrating agents and similar materials may be used.

For the purpose of illustrating the invention various coating compositions have just been described in which wax is the non-elastic organic solid with respect to which an estersil is dispersed. The invention is broadly applicable, of course, to coating compositions containing estersils and other non-elastic organic solids, and such coating compositions can be advantageously employed for various uses.

Coating compositions, including decorative finishes and protective coatings may be prepared comprising estersils and organic polymers. Such organic polymers are enumerated hereinafter, as matrices for dispersed estersils. The coating compositions may be applied either in the form of solutions in solvents or in the form of dispersions or emulsions such as water-based paints.

In clear varnishes and lacquers, estersils are particularly advantageous from the standpoint of providing flatting effects without detracting from the smoothness of the finish. For this use, the more voluminous types of estersils are particularly efficient.

Estersils can be impregnated into the surface of wood with resin binders such as urea formaldehyde, to give unusually hard surface finishes. In paints, lacquers, and varnishes, for application to wood surfaces, estersils can be incorporated to give improved adhesion to the wood. This should reduce peeling of the finish from the wood surface. In furniture varnishes, the incorporation of estersils provides a delustering effect, and facilitates sanding and polishing. Incorporated into floor varnishes, estersils reduce slipperiness and improve hardness and durability.

Estersils also can be combined with organic polymer-type protective coatings, including resins, lacquers, and drying oils to improve adhesion and strengthen the protective films. The estersils can be added also to chemically resistant protective coatings, such as "Teflon," urea formaldehyde, melamine formaldehyde, phenol formaldehyde, cellulose acetate, non-elastic organo-silicon resins, or "silicone" polymers, and all other types of acid and/or alkali resistant protective coatings on metals.

Creaseproofing, crushproofing, and slip-proofing coating compositions for textiles can be improved by the addition of estersils. In most cases the advantage in using the estersils lies in improving the adhesion between the crease, crush, or slipproofing agents and the underlying fiber surface. However, in the case of slipproofing agents, the estersil particles themselves provide a higher degree of friction and can in fact give most of the slipproofing effect. Slipproofing treatments of this type provide dimensional stability and in many cases sufficient amounts of the agents are incorporated to prevent shrinkage and distortion of the textile during washing. For these compositions designed to improve the mechanical properties of textiles, estersils may be combined with a wide variety of emulsion- or solution-type of polymers, including urea formaldehyde, melamine formaldehyde, phenol formaldehyde, polyvinyl alcohol, polyvinyl acetate emulsions, and cellulose acetate.

Coating compositions on textiles which provide products such as artificial leather and oilcloth, are improved by modifying the coating composition with estersils to give improved durability and adhesion to the underlying textile fibers. Estersils, for example, can be added to the drying oils used in making oilcloth and incorporated into resins such as polyvinyl chloride used for coating fabrics.

Adhesives are a special class of coating compositions, being coatings of high adherency and coherency. Many adhesives are dispersions of non-elastic organic solids in an evanescent liquid, and as such they can be improved by the inclusion of estersils.

Adhesives for paper are improved by the incorporation of estersils, particularly those which are organophilic in nature. Polyvinyl acetate emulsion, for example, can be made containing estersils, and applied to paper to obtain a stronger bond.

Adhesives used in making plywood and assembling furniture are improved by the incorporation of estersils; for example, such adhesives as urea-formaldehyde, polyvinyl alcohol, polyvinyl acetate emulsion, and phenol-formaldehyde resin adhesives. In the case of glue and polyvinyl alcohol, estersils improve the water-resistance of the bond and promote adhesion of the bond to the wood surface.

Binders for fibrous ceramic products such as rock-wool and glass fibers are improved through the incorporation of estersils. For example, phenol-formaldehyde resin emulsions may be mixed with estersils, passed through a colloid mill and applied to the fibrous inorganic material to obtain strong bonds which retain their strength even after the organic portion of the bond is burned away at high temperature, the residual silica forming the body of the bond.

The so-called "plastisols," comprising mixtures of particles of a polymer such as polyvinyl chloride with a plasticizer such as dioctylphthalate, can advantageously be thickened with estersils to give plastigels. For instance, by adding from 3 to 12 percent by weight of estersil to a polyvinyl chloride-dioctylphthalate mixture, a plastigel is formed which has been so thickened that it will hold a molded shape without support and can be cured at 350° C. to a permanently formed body.

Inks, such as printing inks and lithographing inks, are improved by the incorporation of estersils as thickening and bodying agents. The estersils are superior to hydrophilic type thickening agents, in that the inks are more water-resistant, and not affected by changes in humidity. The lithographic and printing inks contain a dispersed organic solid, sometimes in the form of a carbon-black pigment and, in any event, as a vehicle consisting of a dispersion of drying oil or lacquer.

It will be evident that in use, upon disappearance of the evanescent liquid from coating compositions as above described, the coating compositions will convert into the other preferred form of the present invention—namely, solid dispersions consisting essentially of a minor proportion of estersil dispersed in a matrix of the non-elastic, organic solid. For instance, when wood is coated with an alcoholic dispersion containing shellac and an estersil, and the alcohol is allowed to evaporate, there remains on the wood a coating consisting of a matrix of solid shellac in which the estersil is dispersed. This coating has improved sandability and moisture resistance by reason of the presence of the estersil. Other instances of compositions having improved usefulness and consisting of an estersil dispersed in a matrix of a non-elastic organic solid will now be described.

Estersils have numerous applications in the plastics (organic polymer) industry. For example, in the manufacture of plastic films, estersils reduce the tackiness of the film surfaces. When incorporated into the organic polymer prior to extrusion into sheets, tubing, or lacing, etc., estersils improve the tensile strength and diminish tackiness after molding.

Estersils are particularly advantageous in organic polymer products when used in relatively large quantities as a reinforcing filler, particularly in transparent or translucent organic polymers which have a refractive index near that of the estersils. This permits the preparation in some cases of almost transparent molded bodies and sheet products containing a very high percentage of inorganic filler without practical loss in stress. The estersils may be used along with a wide variety of other fillers, including wood flour, diatomaceous earth, carbon black, clay, cellulose block, and similar conventional fillers and reinforcing agents where these additional materials are not objectionable from a standpoint of transparency and reduction in mechanical strength.

The term "organic polymer" is used herein to include both natural and synthetic polymeric materials. Organic polymers adapted to be compounded with estersils according to this invention include: cumarone resins; indene resins; acetylene polymers, including their halogenated derivatives; olefin hydrocarbon polymers, including polymers of ethylene and their homologs, and halogen substituted derivatives thereof including polytetrafluorethylene; olefin-sulfur dioxide resins; petroleum resins, including resins formed by oxidation of petroleum and resins formed by reaction of petroleum constituents with such materials as formaldehyde, methylal, metallic halides, sulfur, and sulfur chloride; nylon (polyamide) resins; casein and other protein plastics including casein-formaldehyde plastics; resinous halogenated petroleum hydrocarbons; resins from halogenated petroleum hydrocarbons; resins from cracked hydrocarbons; polystyrene and polymers from styrene derivatives; phenolic resins (the phenolic resins may be A-stage resins, or resols; B-stage resins, or resitols; or resites, or C-stage resins); terpene phenolic resins, Novolak or of the infusible types; phenol-aldehyde resins such as phenol-formaldehyde resins; aldehyde resins; furfural resins; ketone resins; urea-formaldehyde type resins, including thiourea-formaldehyde, melamine-formaldehyde, and dicyandiamide-formaldehyde resins; resorcinol-formaldehyde resins, phenol-resorcinol-formaldehyde resins, and phenolfurfural resins; furan resins; amine-aldehyde resins; melamine resins; urea-modified melamines; cocondensation products of melamine-formaldehyde resins and diglycol carbamate; polyester resins such as the copolymers of diallyl phenyl phosphonate with monomers such as methyl methacrylate, vinyl acetate, diallyl phthalate, diallyl succinate, diallyl oxalate, and unsaturated alkyd resin mixtures; modified alkyd resins prepared by polymerization of phthalic anhydride, maleic anhydride, or sebacic acid or other high molecular weight polybasic acid, with a polyhydric alcohol such as glycerol, the glycols, pentaerythritol, or sorbitol; sulfonamide-aldehyde resins; nitro resins; resins from such nitrogen-containing materials as hydrazine and related substances, pyrazoles, pyridine, quinoline, pyrrole, indole, and carbazole; resins from wood and from carbohydrates; natural resins and their esters, including rosin, shellac, and ester gum; condensation polyester resins, including resins obtained from polyhydric alcohols and polybasic acids, and from hydroxyacids; polyamide resins and derivatives thereof; mixed polyester-polyamide resins; polyester resins; polyvinyl ethers; polyvinyl alcohols; polyvinyl esters, including esters of inorganic acids; polyvinyl acetals, polyacrylic acids, anhydrides, esters, amides, and homologs thereof; condensation resins from halogenated compounds, non-elastic olefin-sulfide resins; phenol-sulfur and phenol-sulfur chloride resins; sulfur-aromatic amine resins; drying oil resins, cellulose and its derivatives, including cellophane regenerated cellulose sheet, cellulose esters, and cellulose ethers; polyacrylonitrile; polymerized esters of terephthalic acid and glycols of the series $$HO(CH_2)_nOH$$

where $n$ is an integer; and proteins such as casein, zein, soybean protein and leather. These may be modified with any of the usual modifying agents including plasticizers pigments, fillers, dyes, and materials which combine chemically with the polymer ingredients either during formation of the polymer or during an after treatment. Thus copolymers, interpolymers, and mixtures of polymers can advantageously be compounded by the process of this invention. The organic polymer can take any form including sheet, rod, tube, supported film, unsupported film, molded article, cast article, powder, and the like.

The estersils may be incorporated into non-elastic organo-inorganic plastics of the organo-silicon or "silicone" types. For example, condensation products of hydrolyzed alkyl chlorosilanes, aryl chlorosilanes, and mixed alkylaryl chlorosilanes, yield silicone polymers suitable for modification with estersils. Polymeric silicone esters such as the butoxy "silicone" and the resinous partial hydrolysis products of ethyl silicate may be compounded with estersils.

Estersils can be incorporated into organic fibers prior to drawing and spinning, in amounts ranging from a trace, up to high percentages, depending upon the effects desired. Estersils can be incorporated into fibers of the following organic polymeric types: nylon, "Orlon polyacrylic fibers," cellulose acetate, polyvinyl chloride, polythene, and all synthetic organic compositions capable of being formed into threads or fibers. The estersils can be incorporated into the fibers in various ways, including dispersion in the fiber melt, dispersion in a polymer suspension prior to forming threads, dispersion in polymer solutions prior to wet or dry spinning, or incorporation into polymer sheeting which is subsequently slit into ribbons or threads. In small amounts, the estersils modify the dyeing characteristics, act as a delusterant, but have only moderate effects on the physical properties such as tensile strength and stiffness. In larger quantities, the fiber or thread modulus is increased and the tensile strength at break is higher than that of the unmodified material, unless the optimum loading is exceeded. Where the thread or fiber is formed without substantial drawing or orientation of the polymer, estersils of substantially spherical, plate-like, or fibrous types are substantially equivalent, but where the formed fiber is subsequently stretched, orienting the polymer, plate-like or fiber-like estersils, dispersed in a colloidal state throughout the organic polymer, are particularly advantageous. Under the latter circumstance the particles of estersils, being anisotropic, become oriented with the polymer structure, giving a higher tensile strength than would otherwise be obtained. For delustering effects, best results are obtained by incorporating the estersil material in such a way as to leave some of the estersil in the form of aggregates sufficiently large to promote the scattering of light, and to give a certain degree of roughness on the fiber surface. The latter roughening effect also improves the anti-slip properties of the fiber. The estersil particles also contribute to better dyeability, especially in the case of highly hydrophobic fibers into which dyestuffs do not penetrate readily. Estersils can be incorporated into fibers, threads, and ribbons of all types for whatever use, including fibers of large diameter such as bristles, where the distributing action of the estersils at high loading is particularly advantageous.

Water adsorption or absorption of normally hydrophobic textiles can be improved by the incorporation of estersils into the fibers. It is preferred to apply the estersils and heat the fibers to anchor the estersils to the fiber surface, or alternatively the estersils can be held to the fiber surface with minor amounts of water-insoluble adhesives and binders as already described above in connection with coating compositions. When applied to the surface of fibers by either method, the organophilic ester groups tend to remain oriented toward the hydrophobic fiber surface, while the estersil particles oriented away from the surface are either hydrophilic or become hydrophilic during laundering. Estersils are particularly important in nylon and in "Orlon" polyacrylic fibers, which are normally rather hydrophobic, and the incorporation of quantities ranging from 1 to 25% in these polymers improves the rate of wetting in water and enhances the rate of migration of moisture through textiles of these fibers through the improved wick action. This makes these materials more suitable for use in clothing which is worn next to the skin. On the other hand, it should be pointed out that while the surface of the fibers is thus improved with respect to wettability by water, the adsorption of water within the fiber is not undesirably increased, so that the textiles dry rapidly after laundering.

Shrinkproofing agents consisting of resins insolubilized upon textile products can be modified by the inclusion of estersils.

Soap cakes containing dispersed estersils have several advantages. In a matrix of solid soap estersils provide a more solid cake which softens less readily upon standing in water, without hardening the soap sufficiently to prevent satisfactorily rapid lathering. In larger quantities, estersils in combination with surface-active agents such as the cationic synthetic detergents and soap, non-ionic polyethylene oxide detergents, or long chain quaternary ammonium surface-active agents, such as lorol trimethyl-ammonium chloride, give improved dispersion of soil and more complete cleansing.

Estersils can be incorporated into insecticides in a liquid state, for example, molten DDT, to give products which can be more easily flaked and dispersed to a finely divided form which has less tendency to cake in the container.

Estersils may be used as thickening agents in pastes and salves used for farm animals where the pastes or salves contain an organic solid.

Estersils can be incorporated into non-elastic types of wire insulation including polythene, chlorinated polythene, "Teflon polytetrafluorethylene," polyvinyl chloride, polyvinyl acetate, non-elastic silicone resins, and can be used along with other thickeners and reinforcing fillers such as pulverized glass fibers. The estersils improve adhesion of the insulation to the underlying metal, and toughen and strengthen the insulating coatings.

Baking siliceous-containing silicone resins, or mixtures of silicone resins and alkyd resins, may be modified by the incorporation of estersils.

Wood flour products can be dusted with dry estersils to improve the mechanical flow properties of such powders, and to increase the mechanical strength of resin laminates and molded resin products containing the wood flour. Wood flour mixed with organic binders such as cellulose nitrate are hardened and strengthened by the admixture of estersil with the resin binder.

It is to be understood that, in describing the various compositions which are improved by the incorporation of estersils, no attempt has been made to mention all of the various additives found in such compositions. Antioxidants, softeners, pigments, accelerators, and a whole host of additives are known in the various arts. Where a particular art is discussed herein and the principal ingredients of the compositions are mentioned, the additives known to the art can also be included in amounts and combinations heretofore known.

It will be observed that in all of the compositions above-described the estersil is dispersed with respect to the organic solid. In the coating compositions, which include a liquid carrier, the organic solid, as well as the estersil, is dispersed. In the compositions wherein the organic solid is a matrix it is only the estersil which is dispersed.

The estersil is present in the compositions of this invention in minor proportion relative to the organic solid. Thus, the weight of estersil present is less than the weight of organic solid present, although by reason of the presence of other constituents, such as the liquid carrier of the coating compositions, the weight of organic solid itself may be a minor proportion of the total weight of the composition.

The following examples are illustrative:

*Example 1*

A paste wax formulation, typical of those produced commercially, was modified with an estersil as follows:

| | Parts by Weight | |
|---|---|---|
| | Control | Modified |
| Carnauba Wax, No. 3 NC | 1.5 | 1.0 |
| Ceresin Wax, No. 101 White | 1.5 | 1.0 |
| Estersil (substrate surface area 297 m.²/g., 3.23 butyl groups per square millimicron) | 0.0 | 1.0 |
| Turpentine | 7.0 | 10.0 |
| Total solids, percent | 30 | 23 |

The waxes were melted together in a steam-jacketed stainless steel kettle, equipped with an efficient powered propeller-type stirrer, at 95 to 97° C. Small portions of the estersil (about one-tenth of total) and solvent turpentine (at 80° C.) were alternately added to the stirring wax melt. The addition rate was such that the melt was kept at a viscosity optimum for maximum shear action in order to insure proper dispersion of the estersil. The melt temperature during this addition was maintained at 95 to 97° C. After all of the silica was incorporated, stirring of the viscous melt was continued for 10 minutes and the remainder of the solvent (at 80° C.) was then added. The blend was then cooled with stirring to 50° C., by passing cold water through the jacket of the kettle, and was poured into glass jars and allowed to cool at room temperature and set to a firm pastelike consistency.

A control formulation, containing the same waxes in identical proportions, was prepared by a similar procedure; except that all the turpentine was added to the molten wax at once.

The incorporation of the estersil into the molten waxes causes a great increase in viscosity of the melt and in the hardness of the finished product. This allows the preparation of a paste wax modified with estersil at a lower total solids content than when the silica is not employed having equal consistency and spreading properties.

The above paste wax was evaluated, after application to a varnished pine walkway surface, by measuring gloss with a Gardner 60° glossmeter and slip resistance by a panel of twelve people wearing various types of shoe soles with results as follows:

| Paste Wax | Ease of Application | Buffed Gloss | Slip Resistance |
|---|---|---|---|
| Control | Excellent | 45 | Slippery, unsafe. |
| Control plus Estersil | do | 43 | Very much less slippery, considered to be safe. |

In general, it has been found that a wax to silica ratio (solid basis) of 2:1 is optimum for adequate slip resistance, but these proportions may be altered to effect the degree of resistance to slip desired within the range of 5:1 to 1:1.

Liquid solvent waxes are generally of the same composition as paste waxes, but have a solids content of 10 to 12 percent whereas paste waxes contain 25 to 30 percent solids. This type floor finish is easier to apply and, because of its additional solvent, has some cleansing ability. Solvent waxes are generally dispersions of solidified wax in solvent saturated with dissolved wax.

*Example 2*

A liquid solvent wax containing an estersil was prepared according to the above described formula and procedure except that additional solvent was added to give a total solids of 10 percent and the hot blend was cooled rapidly to room temperature with vigorous stirring to control the particle size of the dispersed wax phase. A control liquid solvent wax was also prepared at 10 percent total solids and evaluated in comparison with the estersil-modified wax by the test methods heretofore described. Test results for these preparations were comparable to those described above for the paste wax. The slip resistance of the liquid solvent wax containing 33 percent of estersil (based on total solids) was much greater than for the unmodified wax while gloss and ease of application were equivalent.

*Example 3*

A commercial grade of black offset printing ink was modified by adding 5 parts by weight of an estersil (butanol-esterified) to 95 parts of ink. The estersil was premixed with the ink by blending in a beaker with a spatula and then passed seven times through a Kent, 3 roll paint mill with the rolls set at a clearance of 0.0015 inch. A measured portion of the estersil-modified and of the unmodified inks was then drawn down on No. 4 grade white bond paper with a spatula. Water droplets were placed on each "drawdown" before the ink was dry to determine differences in water repellency. After the ink was dry the coated areas were examined and compared as follows:

| Ink Tested | Examination of Drawdown |
| --- | --- |
| Control, no estersil | Definite water spotting; "wrinkling" or "skinning" at thick ink layers; purplish cast and considerable penetration of paper by ink. |
| Control plus 5% estersil | Very slight water spotting; no "wrinkling" or "skinning"; very black with no penetration of paper by ink. |

This example shows that the addition of 5 percent of estersil to a commercial offset printing ink (a) reduces penetration of the ink thereby giving better coverage despite the reduction in color pigment, (b) reduces "wrinkling" and "skinning" when the ink dries in thick layers, and (c) reduces water spotting when water droplets are placed on the wet inked surface.

*Example 4*

Polythene film filled with 10 percent of a butanol-esterified estersil was prepared by incorporating the estersil into the polythene while milling on a two-roll rubber mill at a roll temperature of 100 to 110° C. The resultant milled stock was then extruded by conventional means as a 5 to 7 mil film. The clarity of the estersil-loaded film compared favorably with films of unmodified polythene prepared in like manner.

The reinforcing effect of the silica on polythene films of equal thickness is depicted by the following physical test data:

| Physical Property | Polythene | Polythene Filled With 10% Estersil |
| --- | --- | --- |
| Elmendorf Tear, g./ml.: | | |
| machine direction | 102 | 121 |
| Transverse direction | 113 | 183 |
| Modulus, lbs./sq. in.: | | |
| machine direction | 16,300 | 19,100 |
| Transverse direction | 17,000 | 20,600 |
| Tensile Strength, lbs./sq. in.: | | |
| machine direction | 1,500 | 1,470 |
| Transverse direction | 1,070 | 1,500 |
| Elongation at Break, Percent: | | |
| machine direction | 451 | 387 |
| Transverse direction | 174 | 424 |
| Initial Tear, lbs./in.: | | |
| machine direction | 341 | 364 |
| Transverse direction | 291 | 337 |

These data show that the addition of 10 percent of estersil to polythene effects a substantial improvement in physical properties, particularly an increase in tear strength in the transverse direction without any loss in elongation.

*Example 5*

A pronounced flatting effect has been found for various finishes into which estersils, in concentrations of 3 and 5 percent, have been incorporated. The effect on gloss compared to controls is given in the following table. Unless otherwise indicated all finishes apply to steel panels.

| Finish | Percent Estersil [1] | Method of Incorp'n | Glossmeter [2] Reading | Remarks |
| --- | --- | --- | --- | --- |
| Clear lacquer | 0 | 3-roll ink mill | 66 | |
| Do | 5 | do | 10 | |
| Do | 0 | mech. mix | 83 | Black gloss background. |
| Do | 3 | do | 5 | Do. |
| Clear varnish | 0 | 3-roll ink mill | 98 | |
| Do | 5 | do | 45 | |
| Green paint | 0 | do | 81 | |
| Do | 3 | do | 25 | |
| Alkyd resin enamel (white) | 0 | do | 84 | |
| Do | 3 | do | 20 | |

[1] Butanol esterified. Degree of esterification = 3.39 butyl groups per square millimicron. Surface area of substrate = 294 m.$^2$/g.
[2] Gardner portable 60° glossmeter.

*Example 6*

One and one-half percent by weight of the estersil described in Example 5 was stirred into "Selectron" 5003, a polyester resin (ethylene glycol and fumaric acid/maleic acid mixture) and test panels of glass fiber laminate were made up by a procedure generally accepted by industry for the preparation of test panels. Compared to a control laminate containing no estersil, increased translucency was observed and improvements in both wet and dry flexural strength were obtained with the estersil-reinforced product.

| | Flexural modulus, lbs./in.$^2$×10$^3$ |
| --- | --- |
| Control | wet—49.1 and 49.5. dry—61.2. |
| 1½% Estersil Product Laminate | wet—54.9 and 57.9. dry—70.3. |

I claim:
1. A composition comprising polyethylene and, dispersed therein, an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, said estersil being present in a minor amount based on the total weight of polyethylene and estersil.

2. A composition of claim 1 in the form of film.

References Cited in the file of this patent

UNITED STATES PATENTS

| | | |
|---|---|---|
| 2,042,702 | Dreyfus | June 2, 1936 |
| 2,058,844 | Vaughn | Oct. 27, 1936 |
| 2,676,148 | Iler | Apr. 20, 1954 |
| 2,705,700 | Iler | Apr. 5, 1955 |
| 2,727,876 | Iler | Dec. 20, 1955 |

FOREIGN PATENTS

| | | |
|---|---|---|
| 611,990 | Great Britain | Nov. 5, 1948 |